United States Patent [19]

Jones

[11] 4,193,640
[45] Mar. 18, 1980

[54] HUB CAP LOCKING DEVICE

[76] Inventor: Sylvanus B. Jones, Jones' Hill - 16 Bausum Dr., Annapolis, Md. 21401

[21] Appl. No.: 958,803

[22] Filed: Nov. 8, 1978

Related U.S. Application Data

[63] Continuation-in-part of Ser. No. 852,815, Nov. 11, 1977, abandoned.

[51] Int. Cl.² .............................................. B60B 7/00
[52] U.S. Cl. .................................. 301/37 AT; 85/36
[58] Field of Search ............ 301/37 R, 37 AT, 108 R, 301/108 A, 108 S; 70/14, 15, 166, 167, 259, 260; 151/61, 62, 24; 85/33, 36; 59/93

[56] References Cited

U.S. PATENT DOCUMENTS

| | | | |
|---|---|---|---|
| 1,828,658 | 10/1931 | Henke | 70/260 |
| 1,921,434 | 8/1933 | Stone | 70/14 |
| 2,601,017 | 6/1952 | Herrick | 301/108 R |
| 3,456,550 | 7/1969 | Meyer | 85/36 |

*Primary Examiner*—H. Grant Skaggs

[57] ABSTRACT

The invention is specifically a hub cap locking device and in general a retaining device for appropriate uses and is used primarily with hub caps and wheels of vehicles, and it is designed primarily to secure such hub caps to the wheel adapters of vehicles protecting expensive hub caps from theft or unauthorized removal and protecting all hub caps from accidental loss during the course of use.

1 Claim, 5 Drawing Figures

HUB CAP LOCKING DEVICE

This application is a continuation-in-part of Ser. No. 852,815 filed Nov. 11, 1977, and now abandoned.

The invention is designed primarily for use on all vehicles that use hub caps to cover its wheels. The invention has flexibility of use with high efficiency and is inexpensive to produce. The invention is an improvement over previous related inventions as it can be used with any hub cap without altering the hub cap, the wheel or the wheel adpater, and it does not require special complex locks and keys.

The principal objective of the invention is to provide a locking device to protect hub caps from theft, unauthorized removal and accidental loss during the course of use or travel.

Another objective of the invention is to provide a hub cap locking device economically produced of flexible cable or chain links enclosed in a protective flexible cover so that it can be threaded through certain hub caps which have inner rims and certain other hub caps without inner rims that will use a metal hooked apparatus affixed to the inside cover of such hub caps through which the flexible hub cap locking device may be threaded.

Another objective of this invention is to provide an easy and quick means of removing the hub cap locking device from the wheel adapter of the vehicle when it is necessary to exchange the wheel and tire.

An additional objective of the invention is to provide a hub cap locking device which is made of a lightweight, metallic material so as not to interfere with the steering and alignment of the vehicle even when it is in motion.

Another objective of the invention is to provide an uncomplicated metallic locking disc which is affixed to each end of the hub cap locking device with an aperture which will easily fit over a bolt of a plurality of bolts of the wheel adapter with each locking disc containing an adjustable sliding latch which can be adjusted to fit tightly and locked between the threads of the particular bolt of the wheel adapter by an adjustable locking screw.

Other objectives as well as a fuller understanding of this invention maybe had by referring to the following description and the claim in conjunction with the accompanying drawings.

Figure 1:
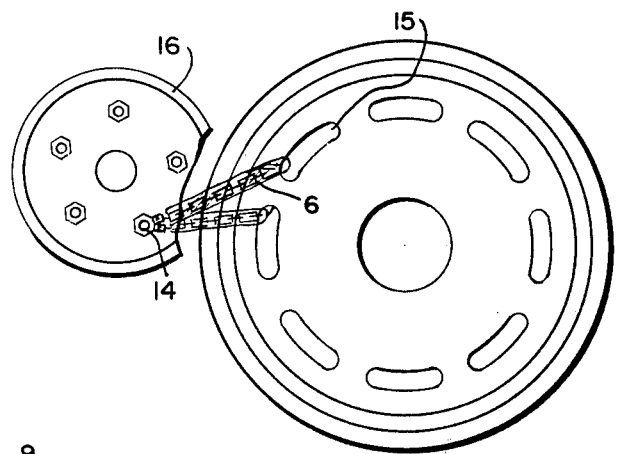
FIG. 1 is an elevated view of the invention, a wheel adapter of a vehicle with a plurality of bolts and nuts affixed thereto and an inner rim of a hub cap with a plurality of apertures.
Figure 2:
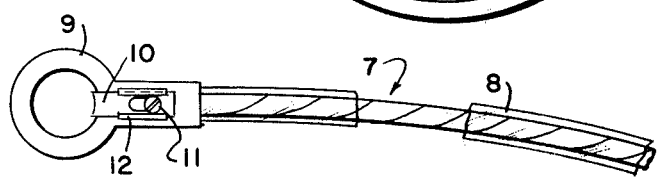
FIG. 2 is a plan view of the locking device enclosed in a flexible cover showing the sliding latch which will lock between the threads of a bolt of a plurality of bolts on the wheel adapter of a vehicle.
Figure 4:
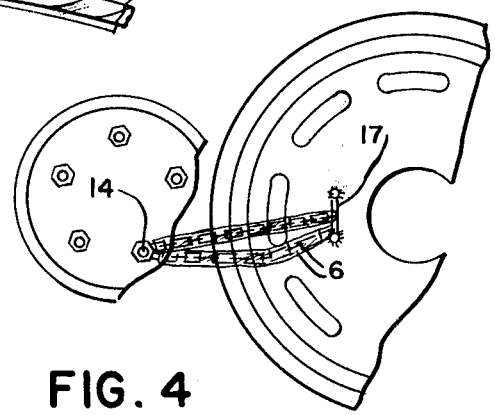
FIG. 4 is an elevated view of the invention threaded through a metal hooked apparatus affixed to the inside cover of certain hub caps and fastened to a particular bolt of the wheel adapter.
Figure 5:
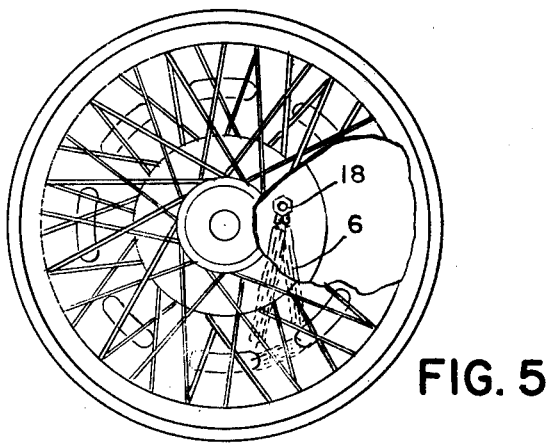
FIG. 5 is an elevated view with a fragmentary opening in the hub cap mounted on the wheel showing the hub cap locking device assembled in position and locked onto a bolt of a plurality of bolts on the wheel adapter of the vehicle and further secured by a lug nut having been screwed over the locking device.
Figure 3:
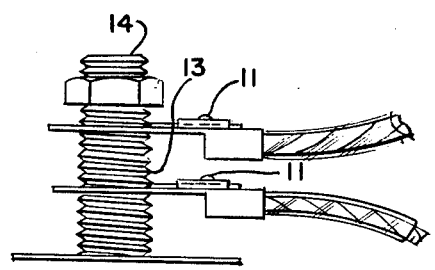
FIG. 3 is an elevated view of the locking disc affixed to the ends of the flexible cable with an adjustable sliding latch which has been pushed forward and locked thereby an adjustable locking screw to fasten tightly between the threads of a particular bolt on the wheel adpater.

In FIG. 1 the hub cap locking device 6 has been threaded through two (2) apertures of the inner rim 15 of a hub cap and both ends are secured to a bolt 14 of a plurality of bolts on the wheel adapter 16 of a vehicle locking the hub cap to the wheel adapter. In FIG. 2 is shown a part of the hub cap locking device comprised of a metallic cable 7 enclosed in a protective flexible cover 8 with a metallic disc 9 with an aperture so as to fit over such bolt 14 on the wheel adapter 16 as shown in FIG. 1. Attached to the disc and the end of the said cable is a sliding metallic latch 10 with a small rectangular aperture through which is mounted a locking screw with a circular-flare head 11 which retains the latch 10 to a small metallic rectangular plate with flanged sides 12. FIG. 3 shows both ends of the hub cap locking device and on each end is shown the one bevelled edge of the latch 10 which slides forward and remains tightly between the threads 13 of such bolt 14 when an appropriate screw driver is used to tighten the circular-flare headed locking screw 11 against the encased latch 10 and the said rectangular plate 12 with flanged sides. In FIG. 4 is shown that the hub cap locking device 6 has been threaded through a mounted metallic hooked apparatus 17 affixed to the inside cover of a hub cap and has been secured to such bolt 14 of the wheel adapter as an alternative method of securing the hub cap locking device to certain hub caps without inner rims. In FIG. 5 the fragmentary front view shows the hub cap locking device 6 secured to such bolt 14 of a plurality of bolts on the wheel adapter after the wheel and tire have been secured to such wheel adapter by a lug nut 18 of a plurality of lug nuts.

It will therefore be seen that this hub cap locking device which may comprise linkage such as chain links or cable of a suitable length enclosed in a flexible cover can aid in protecting against hub cap theft or loss when threaded through the inner rim of some hub caps or threaded through a hooked apparatus affixed to the inside cover of certain other hub caps and secured to a bolt of a plurality of bolts on the wheel adapter by a locking disc attached to each end of the hub cap locking device. Such locking disc fits around the said bolt on the wheel adapter, and the one concave bevelled edge of the attached rectangular latch assembly slides tightly between the threads of the said bolt locking the disc around the bolt when the circular-flare headed locking screw on the said latch assembly is tighten with an appropriate screw driver or similar screwing device. Having been locked onto said bolt and onto the hub cap and having sufficient flexibility in movement, the hub cap locking device will allow the hub cap to be positioned securely on the rim of the wheel of a vehicle in the usual manner.

Unlike previous related inventions, no complicated apparatus, expensive lock cylinders, brackets or especially designed hub caps are necessary and are used with this new uncomplicated invention of a hub cap locking device.

Although this invention has been described in its preferred form, it is understood that various modifications and substitutions maybe made by those skilled in the art without departing from the spirit and scope of the invention.

I claim:

1. A hub cap locking device used to secure hub caps to the wheel adapters of vehicles comprising a metallic linkage enclosed in a protective flexible cover having a locking disc on each end with an aperture in the center of said disc to accommodate one bolt of a plurality of bolts on said wheel adapter and having affixed to both ends of said cable and overlapping said disc a metallic latch slidably mounted on a small metallic rectangular plate; said plate having flanges to retain said latch; said latch having a small rectangular aperture through its center through which is mounted to the said small rectangular plate a circular-flare headed locking screw the mounting of the latch being such that a bevelled edge of the said sliding latch can be guided tightly between the threads of said bolt on the wheel adapter and the locking screw can then be turn to lock said sliding latch against the said small rectangular plate whereby both said locking discs of the hub cap locking device can be secured to the said bolt on the wheel adapter after the hub cap locking device has been threaded through apertures of the inner rim of the hub cap or has been threaded through a hooked apparatus on the hub cap having sufficient length and flexibility in movement to allow the hub cap to be affixed securely to the rim of the wheel of the vehicle.

* * * * *